Oct. 28, 1930.  S. EINSTEIN  1,779,467
PROCESS OF GRINDING
Filed Sept. 22, 1928
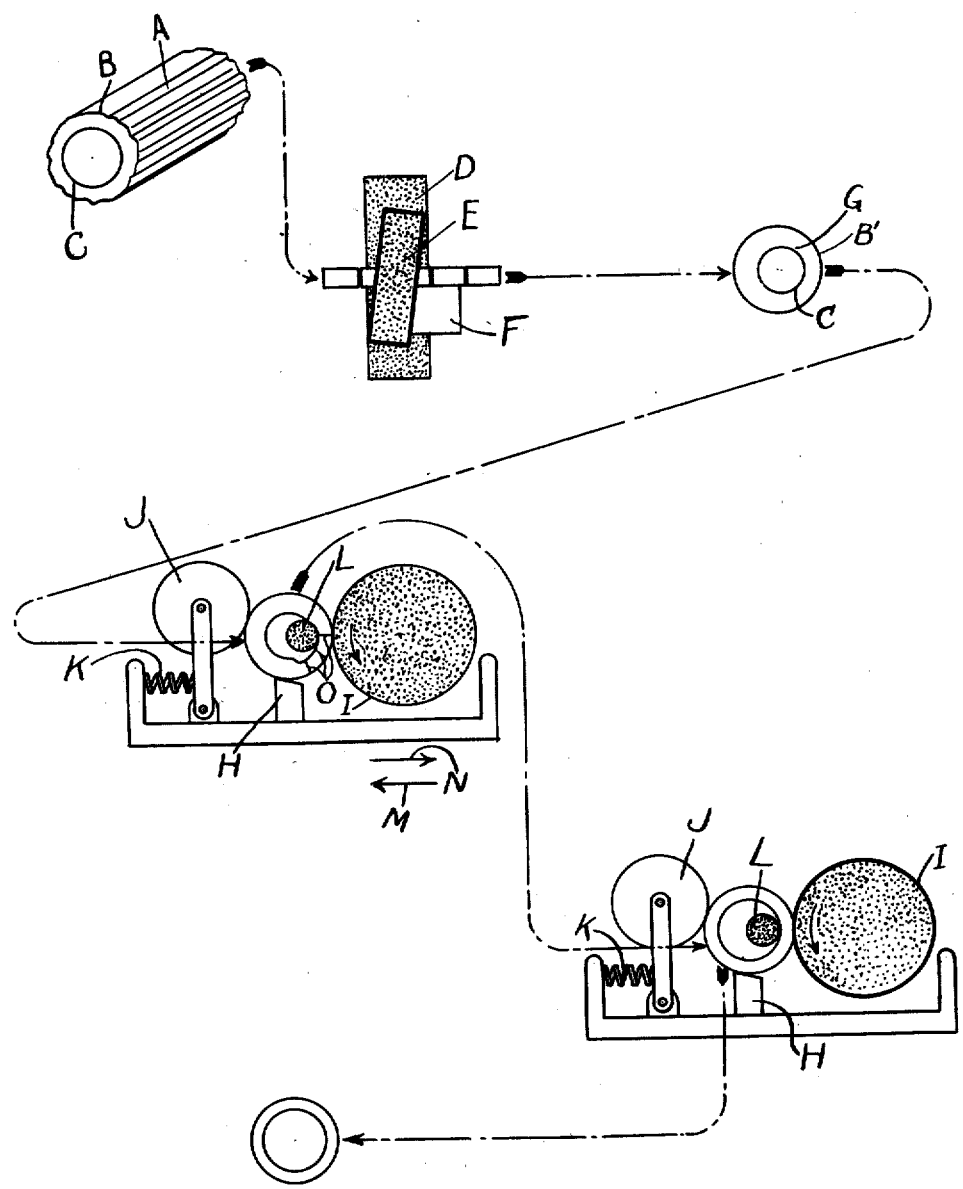
Inventor
SOL EINSTEIN, Patented Oct. 28, 1930

1,779,467

UNITED STATES PATENT OFFICE

SOL EINSTEIN, OF CINCINNATI, OHIO, ASSIGNOR TO CINCINNATI GRINDERS INCORPORATED, OF CINCINNATI, OHIO, A CORPORATION OF OHIO

PROCESS OF GRINDING

Original application filed May 23, 1927, Serial No. 193,518. Divided and this application filed September 22, 1928. Serial No. 307,683.

This invention relates to an improved process of grinding particularly adaptable for the production of tubular or like articles such as bushings, races for ball and roller bearings and other articles in which proper accurate concentricity of inner and outer surfaces is essential and is a division of my application for grinding machinery Serial No. 193,518 which was filed May 23, 1927.

Prior to the present invention internal grinding of tubular articles in which a definite relationship was desired between inner and outer surfaces has customarily been performed by mounting the article to be ground in a suitable work holding head, centering chuck or the like. While in some instances a planetary motion has been imparted to the grinding member itself, it has been the usual and accepted practice to rotate the work holding member or chuck to feed or carry the surface to be operated upon past the grinding wheel while the grinding wheel itself has been rotated at a high rate of speed to perform the necessary stock removal. Due to the fact that the position of the work at any individual moment is dependent not only upon the proper inter-fitting of the work holding member of the chuck or work support and the work with respect to the axis of rotation of the chuck and also upon any play existing in the bearings. The tolerances in commercial production of work of this sort have necessarily been relatively large as respects the specified tolerances for ordinary cylindrical work. Moreover considerable manufacturing difficulties have been experienced due to the fact that as a commercial propostition it has been found impossible once a work piece has been removed from a chuck to again re-insert it in the identical position to a fractional thousandth of an inch. This has rendered it essential in the past to rough grind and finish the individual article in one operation and without removal from the chuck either by the use of consecutively operating, roughing and finishing wheels or by the withdrawal of the wheel used for roughing, retruing thereof and re-engagement with the work. This latter has also possessed the additional disadvantage that maximum efficiency of machine could not be accomplished as a wheel had to be employed which was neither the best wheel for rapid roughing operation nor the best wheel for final finish grinding but a compromise of some sort between the two proper wheels for these operations.

Modern manufacturing methods and the demand for products of maximum accuracy have caused the reduction in ordinary grinding tolerances to a fractional thousandth of an inch and it is one of the purposes of the present invention to provide a novel process of manufacture which will make it possible to produce internally ground tubes, bushings or the like on a commercial basis more accurate as to concentricity of inner and outer surfaces and with a wall thickness more uniform in diameter to the fractional thousandth of an inch than is possible with prior process of manufacture.

A further object of the present invention is the provision of an improved process for the production of hollow internally ground articles which will make possible interchangeable accurate positioning of individual work pieces in identical position in a machine in which they have been previously operated upon or in a corresponding machine for continuation of the general process of manufacture of the article and without in any wise impairing the accuracy of the final product.

Another object of the invention is the provision of an improved process for the commerical production of articles of ring-like form in cross section with absolute uniformity of wall thickness in a radial direction at any point about the circumference thereof in an individual article and of corresponding uniformity within finest precision limits in any group or series of articles so produced.

Further objects and advantages of the present improved process should be readily understood by referring to the ensuing specification considered in conjunction with the appended diagrammatic view illustrative thereof and it is to be understood that any modifications of variations in the exact steps of the process hereinafter described may be made within the scope of the appended claims without departing from or exceeding the spirit of the invention.

As distinguished from prior art production methods in which the work piece was mounted in a chuck or the like dependent for accuracy of position not only on the centering mechanism of the chuck itself but also on the accuracy of the bearings or supports for this chuck the present invention broadly considered contemplates, first suitably forming or shaping the exterior or outer surface of the work piece and subsequently directly utilizing said preformed outer surface as a guiding templet or determinate for the position of individual points on the surface thereof with respect to the member generating the interior wall or form of the work piece. That the performance of the process and its advantages may be more readily understood and appreciated reference is made to the accompanying drawing diagrammatically illustrating the progress of the article from rough blank to finished work piece. In these drawings the letter A designates a suitable tubular member such as a bushing for a bearing or the like. This member may have been suitably formed by molding, turning or the like to a general cylindrical form by any known mechanisms. It has an outer surface B and a hollow interior bounded by the inner surface C. While it will be understood the present invention in its broad aspect is applicable to the formation of elliptical or other shapes of work it will here be specifically described in conjunction with the production of members of true circular form in cross section. In the carrying out of the process the rough work piece shown in A has the outer surface B suitably reduced from its initial rough or uneven condition to that of a true circle. Dependent upon the use to which the outer surface is to be placed this preforming of said surface may be performed by different known methods of manufacture either by accurate turning or by grinding in a center grinding machine or the like. If extreme accuracy is desired however this preforming of the outer surface of the article is preferably performed in a centerless grinder utilizing, for example, the process for most rapid and accurate production thereof set forth in my Patent No. 1,670,717 of May 22, 1928. This however is referred to broadly as the formation of an outer surface accurate as to roundness to within one or two ten thousandth of an inch by centerless grinding. This is effected by passing the work between a grinding wheel D and regulating wheel E of a centerless grinder, the work being supported during such grinding as by a work rest F. The advantage of utilization of a centerless grinder by either through feed or in-feed methods for the production of the outer cylindrical surface resides in the fact that in this grinder the work is automatically rounded up independent of terminal centers or the like with a greater degree of accuracy as to roundness than is possible to commercially attain with other known methods of manufacture. Being independent of terminal centers or the like, however, the work in a centerless grinder does not necessarily have in final form the same axis as that of the original rough work piece and in fact the final axis determined by the grinder itself will be found normally to be eccentrically located as respects the initial axis. The drawing illustrates at G in somewhat exaggerated form for purposes of clarity this eccentricity of the original inner surface C of the work piece as respects the outer preformed or finished surface B' after the work in process of manufacture has passed through the centerless grinder mechanism. In the continuation of the process of manufacture here contemplated the work is now suitably supported utilizing this preformed outer surface as a guide or templet for positioning the work piece, the work being rotated direct on this surface in engagement with suitable accurate supporting guides which will hold same in definite relation to a generator for the inner surface so that the inner and outer surfaces will ultimately be coaxial and the entire article have absolutely uniform wall thickness along any radii in a given cross-sectional plane.

One suitable form of mechanism for holding and rotating the work while generating the inner surface thereof is described in detail in my co-pending application of which this is a division and is diagrammatically shown in the drawing. This mechanism includes an angle top work rest blade or support H serving in conjunction with the surface of regulating wheel I to provide a work receiving trough. The regulating wheel is preferably formed from abrasive material and is power operated to rotate in the direction of the arrow indicated thereon at a slow rate of speed to frictionally engage the surface of the work and control the rate of rotation thereof.

It will thus be noted that the work rest H and regulating wheel I form two rigid and unyielding contact members for surface engagement with the preformed outer surface of the work to position said outer surface accurately as well as to impart relative movement thereto by surface progression of the regulating wheel without the necessity of external driving dogs, connections or the like tending to disturb the position of the work. To insure proper contact between the regulating wheel and work and normally to retain the work in position in the trough between work rest and regulating wheel use may be made of the pressure roller J urged toward the work as by spring K.

The pressure of this roller J urges the work against the regulating wheel and creates sufficient initial friction to cause a constant and uniform rotation of the work prior to engagement of the grinding wheel therewith so that as the grinding wheel is brought into contact with the work there is no liability of a sudden engagement tending to cause either spinning of the work or formation of an undue cut or indentation prior to proper rotation thereof to present the successive portions of the interior of the work to the grinding wheel for the desired stock removal. This is advantageous under all conditions but is particularly advantageous during the final finish grinding when but slight stock is to be removed and a highly finished surface obtained.

For removal of the stock use is made of a small grinding wheel L of less diameter than the initial internal diameter of the work piece. This grinding wheel is rotated at a high rate of speed and preferably in a direction urging the work piece into the trough between regulating wheel and work rest. In the diagrammatic illustration two of these set ups are illustrated as the preferred manner of performing the process in that the first is utilized for the heavy or rough grinding cut with a suitable wheel for maximum stock removal in a minimum period of time while in the second a finer wheel is utilized for the finish grinding to insure maximum accuracy and high degree of surface finish.

It will be understood that for performance of grinding it is necessary that either the grinding wheel be fed into the work or the work moved toward the grinding wheel to permit of the grinding wheel being first introduced into the hollow interior of the work and subsequently to engage the work in such manner as to remove the desired stock therefrom. Inasmuch as this may be effected either by shifting of the grinding wheel itself or alternatively by a shifting of the trough comprising regulating wheel and work rest the arrows M and N have been utilized to indicate the existence of the relative motion in the two directions.

The diagram further indicates what has been found to be a preferred relative location of the parts in which the axis of the outer surface G of the work piece, the axis of rotation of the grinding wheel and the axis of rotation of the regulating wheel in a vertical plane all lie on a common center line. This has the advantage that the grinding wheel and regulating wheel both contact with the work on the same radial line through the work piece. The thickness of wall of the work is then measured by the length of this radial line between the operative surfaces of grinding wheel and regulating wheel and is determined by the existing space or separation between their two operative surfaces.

In effect therefore the work receives a rotary movement successively presenting the various radii thereof to the common center line of the grinding and regulating wheels which in the ultimate finishing operation are maintained a constant and predetermined distance apart with the result that all of these fractional radii O which are the measure of thickness of the wall of the work piece may be finished identical in length to within one or two ten thousandths of an inch or less so that the inner and outer surfaces of the work are absolutely concentric and the entire wall at any cross sectional points selected for measurement of uniform thickness. It is for this reason that the process while particularly applicable in the formation of tubular members of circular cross section may also be utilized to advantage in the case of elliptical or other tubes. A further advantage inherent in the production of articles by the present process resides in the fact that the essential uniformity of wall thickness is insured regardless of the exact outside diameter of the work piece as distinguished from prior art methods of manufacture in which grinding is performed to produce a certain internal diameter irrespective of the outside diameter. This latter feature is particularly advantageous in the case of tubes which are to be used as liners or the like by splitting subsequent to final formation and fitted within an exterior container inasmuch as the present process insures a uniform thickness of liner providing the necessary interior diameter or clearance after fitting which cannot be attained with articles produced by the chucking method in which variations in the initial outside diameter would result in undue interior diameter or insufficient diameter dependent on whether the outside diameter of the tube before splitting were under size or over size.

Likewise by the present process of manufacture with a positive pre-rotation of the work and the passing of the work between members respectively engaging the exterior and interior thereof eccentrically disposed initial inner surfaces such as indicated in the drawing may be quickly rounded up in concentric relation to the preformed outer surface more successfully than by prior art chucking methods in which there is always liability of slight eccentric positioning of the work piece which might accentuate rather than cure the initial existing eccentricity of the internal bore or aperture.

From the foregoing description the specific details of the present process should be readily understood. It will be noted the process in a specific aspect comprises the initial preforming of the outer face of a work piece to true circular form in cross section by grinding of said outer surface in a centerless grinder; the subsequent rotation of the work in definite axial position by positive means while utilizing the preformed outer surface thereof as a guide or templet maintaining the actual axis of the outer surface of revolution in fixed position independent of rotating chucks or like holding members; and the generation of an inner surface on the work piece by a generator ultimately operating in definite fixed relation to one of the work surface engaging position determinators whereby uniform wall thickness and concentricity of inner and outer surfaces is insured not only in the single work piece but in a series of correspondingly ground work pieces irrespective of possible variations in outside diameter of the individual work pieces.

Attention is particularly invited to the fact that the position determinator designated as a regulating wheel is subjected to a constant directional pressure during grinding and to the further fact that this wheel is preferably formed from abrasive material of such nature that it may be accurately trued at any time to produce a surface moving in a constant arcuate position relative to the work and therefore unvaryingly supporting and presenting the work irrespective of general looseness or play which may exist in the bearing in which it rotates; this effect not being transferred to the work as is the case in chucking processes where the axis of rotation of a work head or the like is itself the axis of rotation of the work and fluctuations of the work head are directly transmitted to the work deleteriously effecting the accuracy of production thereof.

It will further be understood that the present process may be properly utilized with a grinding wheel of suitable width or a grinding wheel having an axial reciprocation for the production of the desired internal surface of the entire length of the work piece or may be utilized with a narrow grinding wheel for the purpose of forming a ball race, groove, or the like on the work in definite relation to its initial preformed cylindrical surface.

I claim:—

1. The process of producing a tubular work piece of uniform wall thickness consisting in floating the work piece between spaced abrasive wheels respectively engaging the interior and exterior faces thereof, and operating one of said wheels at a rapid rate to remove by grinding the excess of stock over a predetermined work thickness while rotating the other wheel at a slow rate to control the presentation of the work to the grinding wheel.

2. The process of producing a tubular work piece of uniform wall thickness consisting in rotating a work piece having one previously finished surface between rigid abrasive members respectively engaging the interior and exterior surfaces thereof, and removing excess stock with one of said wheels while controlling the movement of the work with another of the wheels.

3. The process of producing a hollow article of uniform wall thickness consisting in initially forming a surface of revolution on the exterior thereof, supporting the work piece for rotation on said preformed outer surface, rotating the work piece and generating a second surface thereon in constant relation to said supporting surface during such rotation.

4. The process of producing a tubular work piece of uniform wall thickness consisting in initially generating a true cylindrical surface of revolution on the work piece and subsequently engaging said surface by a regulating wheel and progressively advancing the wall between said regulating wheel and a grinding wheel in a predetermined spaced relation thereto to generate a second surface on the work in predetermined relation to the first.

5. The art of producing articles of tubular section and the like in which the inner surface is produced by grinding using the outer surface as a progressive determinator of the position of the work with respect to the generator of the inner surface.

6. The process of producing a tubular article having concentric surfaces of different diameters consisting in initially supporting the article on a work rest and in engagement with a rotating regulating wheel controlling the rate of rotation thereof, generating an exterior surface thereon by grinding while utilizing said outer surface by engagement with the work rest and regulating wheel as a position determinate for the work, subsequently similarly supporting the work with the outer surface engaged by a rest and regulating wheel and generating on the article a second surface of lesser diameter whose concentricity with respect to the first surface is controlled by the said position determinates.

7. The process of producing a tubular work piece consisting in initially forming a true outer cylindrical surface thereon, subsequently supporting the article on said surface by a non-yielding work rest member and a progressively advancing work controlling member, urging the member into engagement with said parts to insure pre-rotation thereof, and moving an internal surface generator into engagement with the work in opposition to the rest and work controlling members to remove predetermined amount of stock from the interior of the work piece and maintaining the generator in its established position until the article is reduced to uniform wall thickness, similarly supporting the work for subsequently grinding and moving a second generator into internal engagement therewith while so supporting and maintaining the generator in position to impart a final internal finish to the work piece.

8. The process of producing a tubular article or the like of uniform wall thickness consisting of rotatably supporting the article on bearings engaging the preformed outer surface thereof, imparting rotation thereto, internally engaging the article by an internal grinding member, producing relative movement between the external work supports and the internal grinding member to cause the member to remove stock from the interior thereof, limiting the relative approach of the parts and continuing the rotation and grinding of the member at this limit to produce a uniform wall thickness as determined by the existing separation between exterior work position determinates and interior grinding member.

9. Process of producing a precision ground tubular article of uniform wall thickness consisting in preforming the outer surface thereof to a true cylinder of self determined axis by centerless grinding and subsequently producing a second surface by relative movement of the work and work generator in an orbital path one as respects the other and maintaining said path coaxial with the pre-established axis of the cylindrical outer surface by progressive engagement of controlling means with said predetermined surface during the relative orbital movement.

In testimony whereof I affix my signature.

SOL EINSTEIN.

DISCLAIMER 1,779,467.—*Sol Einstein*, Cincinnati, Ohio. PROCESS OF GRINDING. Patent dated October 28, 1930. Disclaimer filed December 6, 1933, by the assignee, *The Heald Machine Company*.

Hereby enters this disclaimer to claims 1, 2, 3, 4, 5, 6, 8, and 9 in said specification which are in the following words, to wit:

"1. The process of producing a tubular work piece of uniform wall thickness consisting in floating the work piece between spaced abrasive wheels respectively engaging the interior and exterior faces thereof, and operating one of said wheels at a rapid rate to remove by grinding the excess of stock over a predetermined work thickness while rotating the other wheel at a slow rate to control the presentation of the work to the grinding wheel.

"2. The process of producing a tubular work piece of uniform wall thickness consisting in rotating a work piece having one previously finished surface between rigid abrasive members respectively engaging the interior and exterior surfaces thereof, and removing excess stock with one of said wheels while controlling the movement of the work with another of the wheels.

"3. The process of producing a hollow article of uniform wall thickness consisting in initially forming a surface of revolution on the exterior thereof, supporting the work piece for rotation on said preformed outer surface, rotating the work piece and generating a second surface thereon in constant relation to said supporting surface during such rotation.

"4. The process of producing a tubular work piece of uniform wall thickness consisting in initially generating a true cylindrical surface of revolution on the work piece and subsequently engaging said surface by a regulating wheel and progressively advancing the wall between said regulating wheel and a grinding wheel in a predetermined spaced relation thereto to generate a second surface on the work in predetermined relation to the first.

"5. The art of producing articles of tubular section and the like in which the inner surface is produced by grinding using the outer surface as a progressive determinator of the position of the work with respect to the generator of the inner surface.

"6. The process of producing a tubular article having concentric surfaces of different diameters consisting in initially supporting the article on a work rest and in engagement with a rotating regulating wheel controlling the rate of rotation thereof, generating an exterior surface thereon by grinding while utilizing said outer surface by engagement with the work rest and regulating wheel as a position determinate for the work, subsequently similarly supporting the work with the outer surface engaged by a rest and regulating wheel and generating on the article a second surface of lesser diameter whose concentricity with respect to the first surface is controlled by the said position determinates."

"8. The process of producing a tubular article or the like of uniform wall thickness consisting of rotatably supporting the article on bearings engaging the preformed outer surface thereof, imparting rotation thereto, internally engaging the article by an internal grinding member, producing relative movement between the external work supports and the internal grinding member to cause the member to remove stock from the interior thereof, limiting the relative approach of the parts and continuing the rotation and grinding of the member at this limit to produce a uniform wall thickness as determined by the existing separation between exterior work position determinates and interior grinding member.

"9. Process of producing a precision ground tubular article of uniform wall thickness consisting in preforming the outer surface thereof to a true cylinder of self determined axis by centerless grinding and subsequently producing a second surface by relative movement of the work and work generator in an orbital path one as respects the other and maintaining said path coaxial with the pre-established axis of the cylindrical outer surface by progressive engagement of controlling means with said predetermined surface during the relative orbital movement."

[*Official Gazette December 26, 1933.*]